(12) United States Patent
Miyahara et al.

(10) Patent No.: US 10,800,884 B2
(45) Date of Patent: *Oct. 13, 2020

(54) METHOD OF PRODUCING POLYARYLENE SULFIDE

(71) Applicant: Kureha Corporation, Chuo-ku, Tokyo (JP)

(72) Inventors: Michihisa Miyahara, Tokyo (JP); Kenji Suzuki, Tokyo (JP); Hiroshi Sakabe, Tokyo (JP); Yoshikatsu Satake, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/099,606

(22) PCT Filed: Feb. 5, 2018

(86) PCT No.: PCT/JP2018/003803
§ 371 (c)(1),
(2) Date: Nov. 7, 2018

(87) PCT Pub. No.: WO2018/159220
PCT Pub. Date: Sep. 7, 2018

(65) Prior Publication Data
US 2019/0367680 A1    Dec. 5, 2019

(30) Foreign Application Priority Data
Feb. 28, 2017    (JP) ................ 2017-037345

(51) Int. Cl.
*C08G 75/0209*    (2016.01)
*C08G 75/0259*    (2016.01)

(52) U.S. Cl.
CPC ..... *C08G 75/0209* (2013.01); *C08G 75/0259* (2013.01)

(58) Field of Classification Search
CPC ............... C08G 75/14; C08G 75/0263; C08G 75/0268; C08G 75/0259; C08G 75/025; B30B 9/28
See application file for complete search history.

(56) References Cited

U.S. PATENT DOCUMENTS 4,056,515 A    11/1977    Vidaurre
4,060,520 A    11/1977    Irvin
(Continued)

FOREIGN PATENT DOCUMENTS

CN    104955877 A    9/2015
EP    0226909 B1    3/1992
(Continued)

OTHER PUBLICATIONS

English Translation of International Preliminary Report on Patentability dated Sep. 12, 2019 for PCT/JP2018/003803, 6 pgs.
(Continued)

*Primary Examiner* — Shane Fang
(74) *Attorney, Agent, or Firm* — Abel Schillinger, LLP

(57) ABSTRACT

The production method of the present invention includes a step of supplying an organic polar solvent, a sulfur source, and a dihalo aromatic compound as reaction raw materials to at least one of a plurality of reaction vessels mutually communicated via a gas phase; a step of removing at least a portion of the water present in the reaction vessels; and a step of performing a polymerization reaction. These steps are carried out in parallel, and the reaction mixture is sequentially moved between reaction vessels. At that time, the internal temperatures of the reaction vessels are all not less than 150° C.

14 Claims, 4 Drawing Sheets

(56) References Cited

U.S. PATENT DOCUMENTS

| | | | |
|---|---|---|---|
| 4,066,632 | A | 1/1978 | Anderson et al. |
| 6,538,102 | B1 | 3/2003 | Haubs et al. |
| 9,567,437 | B2 | 2/2017 | Odashima et al. |
| 2015/0087776 | A1* | 3/2015 | Chiong .................. C08G 75/14 524/606 |
| 2015/0329677 | A1 | 11/2015 | Odashima et al. |
| 2017/0029570 | A1 | 2/2017 | Kobayashi et al. |
| 2019/0367682 | A1 | 12/2019 | Suzuki et al. |

FOREIGN PATENT DOCUMENTS

| | | |
|---|---|---|
| JP | S453368 B1 | 2/1970 |
| JP | S61136523 A | 6/1986 |
| JP | H0871395 A | 3/1996 |
| JP | H08100064 A | 4/1996 |
| JP | 2002039462 A | 2/2002 |
| JP | 2002505361 A | 2/2002 |
| JP | 2002121271 A | 4/2002 |
| JP | 2008-285565 A | 11/2008 |
| JP | 2008285596 A | 11/2008 |
| JP | 2012188625 A | 10/2012 |
| JP | 2016532770 A | 10/2016 |
| JP | 6473279 B2 | 2/2019 |
| KR | 20150100685 A | 9/2015 |
| WO | 2014/103317 A1 | 7/2014 |
| WO | WO2017179327 A1 | 10/2017 |
| WO | 2018159221 A1 | 9/2018 |

OTHER PUBLICATIONS

Translation of the First Office Action issued by the Korean Intellectual Property Office for KR10-2018-7028955/PCT/JP2018/003803 with dated Feb. 11, 2019.
First Office Action issued by the Japanese Patent Office for JP2018-544949 with dispatch date of Oct. 16, 2018, and English translation thereof.
First Office Action issued by the Korean Intellectual Property Office for KR10-2018-7028955/PCT/JP2018/003803 dated Feb. 11, 2019.
Translation of the First Office Action of the Chinese National Intellectual Property Administration for CN201880001652.3/PCT/JP2018/003803 dated Mar. 15, 2019.
Translation of the Search Report of the Chinese National Intellectual Property Administration for CN201880001652.3/PCT/JP2018/003803 dated Mar. 11, 2019.
International Search Report of PCT/JP2018/003803.
First Office Action of the Chinese National Intellectual Property Administration for CN201880001652.3/PCT/JP2018/003803 dated Mar. 15, 2019.
Search Report of the Chinese National Intellectual Property Administration for CN201880001652.3/PCT/JP2018/003803 dated Mar. 11, 2019.
International Search Report for PCT/JP2018/003804, dated Mar. 27, 2018, 4 pgs.
First Office Action issued by the Japanese Patent Office for JP2018-544954 with dispatch date Oct. 16, 2018, 6 pgs.
English Translation of the International Preliminary Report on Patentability for PCT Application No. PCT/20189/003804, dated Sep. 12, 2019, 6 pgs.
Office Action issued by the Indian Patent Office for IN201817038696 dated Dec. 30, 2019, 5 pgs.
Patent Application of Indian Application No. IN201817032835, published Sep. 20, 2019, 30 pgs.
Office Action for U.S. Appl. No. 16/099,587 dated Sep. 25, 2019, 4 pgs.
Office Action from Japanese Application No. 2019-019153 dated Feb. 25, 2020, 14 pgs.

* cited by examiner

METHOD OF PRODUCING POLYARYLENE SULFIDE

TECHNICAL FIELD

The present invention relates to a method of producing polyarylene sulfide.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS can be formed into various molded products, films, sheets, fibers, and the like by ordinary melt processing methods, such as extrusion molding, injection molding, and compression molding. For this reason, PAS has been widely used in a wide range of technical fields, such as electrical devices, electronic devices, devices for automobiles, packaging materials, and the like.

As a method of producing PAS, represented by PPS, the method disclosed in Patent Document 1 is generally used, and has been widely used for industrial purposes in the related art. Specifically, a generally used method includes heating an alkali metal sulfide, particularly an alkali metal sulfide containing hydrated water, in a polar organic solvent to remove water contained in the alkali metal sulfide hydrate, and then adding a dihalobenzene to perform heat polymerization.

Patent Documents 2 to 4 disclose a continuous polymerization apparatus of PAS in which pressure-resistant polymerization vessels are connected in series and the reaction solution is transported among the polymerization vessels by means of a pressure differential, and a method of continuous polymerization of PAS using the same.

Furthermore, Patent Document 5 discloses a method of producing a sulfur-containing polymer including (a) preparing a mixture containing a sulfide and a solvent in a first reactor, and (b) reacting an aromatic dihalogen compound and the above sulfide in a second reactor to form a sulfur-containing polymer.

Additionally, Patent Document 6 discloses a method of producing polyphenylene sulfide by reacting an alkali metal sulfide and a dihalo aromatic compound in an organic amide solvent.

Furthermore, Patent Document 7 discloses a method of producing polyarylene sulfide by reacting a sulfiding agent and a dihalogenated aromatic compound in an organic polar solvent in the presence of an alkali metal hydroxide.

CITATION LIST

Patent Literature

Patent Document 1: JP S45-3368 T
Patent Document 2: U.S. Pat. No. 4,056,515 B specification
Patent Document 3: U.S. Pat. No. 4,060,520 B specification
Patent Document 4: U.S. Pat. No. 4,066,632 B specification
Patent Document 5: JP 2002-505361 T
Patent Document 6: JP H8-183858 T
Patent Document 7: WO 2011/024879

SUMMARY OF INVENTION

Technical Problem

Producing PAS in a short time is generally considered to be difficult. This is because (i) the water content of the raw materials used for performing polymerization in a short time is preferably low because PAS polymerization is a nucleophilic substitution reaction, but available monomer sulfur sources are generally hydrates and a step for reducing water content is needed prior to the polymerization reaction, and (ii) in the polymerizing step, the sulfur source is present in a state where it has reacted and bonded with water, but water is freed as the sulfur source is consumed through progression of polymerization, and this inhibits the nucleophilic substitution reaction and retards polymerization.

The PAS produced by the method of Patent Document 1 has low molecular weight and melt viscosity, and also needs a long time for water removal (dehydration) preceding polymerization. This lengthens PAS production time and adversely affects yield per unit space-time (space-time yield).

Patent Documents 2 to 4 disclose PAS continuous polymerization apparatuses that use a plurality of polymerization vessels, and methods of continuous polymerization of PAS using these polymerization apparatuses. However, Patent Documents 2 to 4 are insufficient in greatly reducing dehydration time.

Patent Document 5 discloses a technique of reacting a mixture obtained by reacting a sulfur source and a solvent in a first reactor, with p-dichlorobenzene in a second reactor, and dehydrating the hydrated water of the sulfur source during that reaction. The weight average molecular weight of the PAS obtained by the method of Patent Document 5 is low. For this reason, further polymerization is required to productize the PAS obtained by this method, thus making the equipment complicated. Additionally, this method is insufficient in reducing polymerization time and improving space-time yield.

Furthermore, the respective space-time yields of the polyphenylene sulfide according to Patent Document 6 and the polyarylene sulfide according to Patent Document 7 are low.

The present invention takes the above problems into consideration, and an object of the present invention is to provide a production method by which polyarylene sulfide (PAS) having excellent yield per unit space-time (space-time yield) is easily obtained in a short time.

Solution to Problem

To solve the above problem, a method of producing polyarylene sulfide (PAS) according to one embodiment of the present invention (hereinafter, also referred to as "the present production method") includes a supplying step of supplying an organic polar solvent, a sulfur source, and a dihalo aromatic compound as reaction raw materials to at least one of a plurality of reaction vessels mutually communicated via a gas phase; a dehydrating step of removing at least a portion of water present in the plurality of reaction vessels; and a polymerizing step of performing a polymerization reaction of the sulfur source and the dihalo aromatic compound in the organic polar solvent. The steps are carried out in parallel and the reaction mixture is sequentially moved between the reaction vessels. The internal temperatures of the plurality of reaction vessels are all not less than 150° C.

Advantageous Effects of Invention

According to one aspect of the present invention, a production method is provided by which PAS having excellent yield per unit space-time (space-time yield) is easily obtained in a short time.

DESCRIPTION OF EMBODIMENTS

Embodiment 1

An embodiment of the present invention will be described in detail below.

Polyarylene Sulfide Continuous Production Apparatus

First, the configuration of a polyarylene sulfide (PAS) continuous production apparatus that can be used in the method of producing PAS according to an embodiment of the present invention (hereinafter, also referred to as "the present production method") will be described based on FIG. 1.

Figure 1:
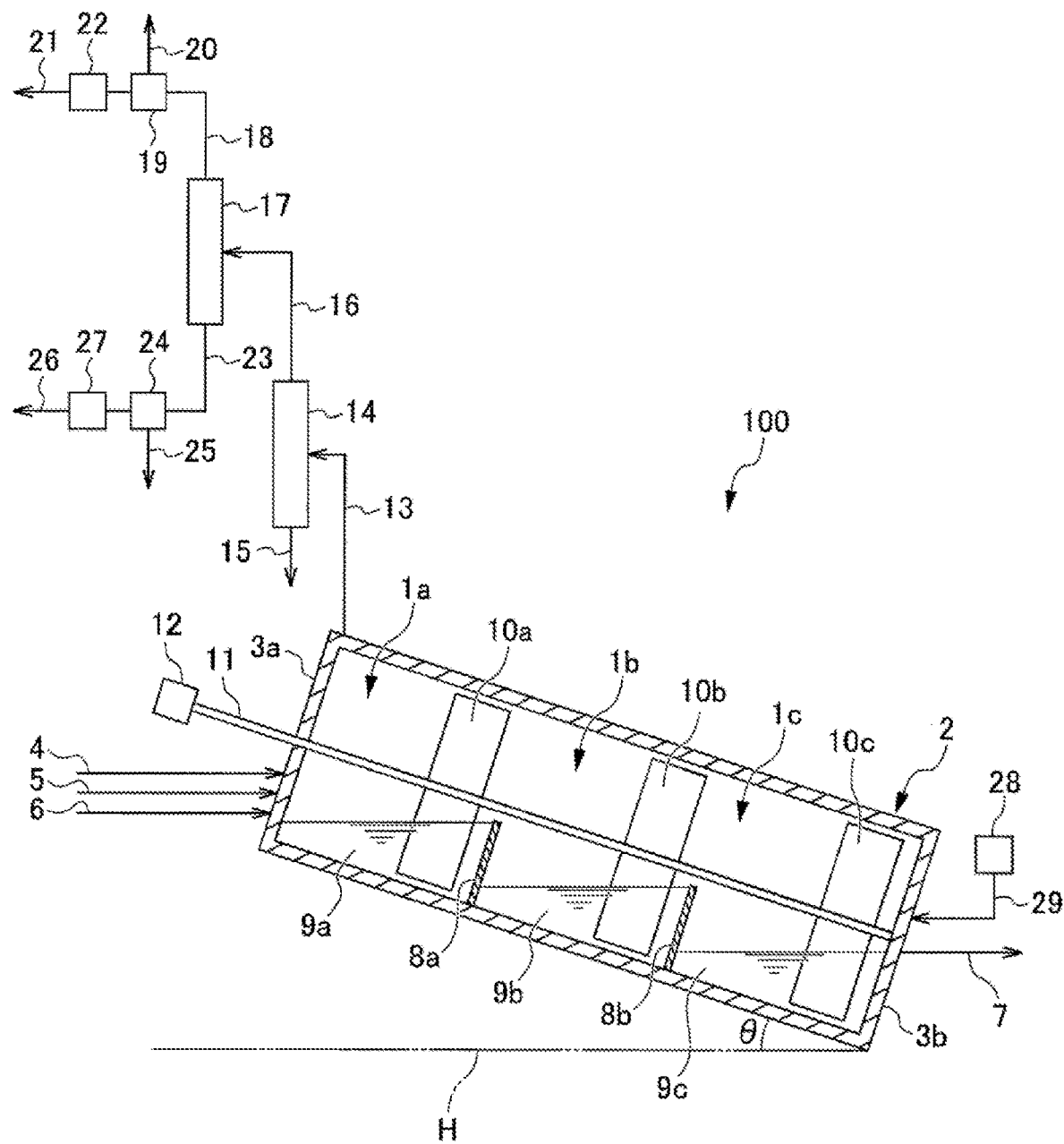
FIG. 1 is a partial cross-sectional view of a PAS continuous production apparatus according to Embodiment 1 of the present invention.

FIG. 1 is a partial cross-sectional view illustrating the configuration of a PAS continuous production apparatus that can be used in the method of producing PAS according to the present embodiment.

To describe the apparatus in reference to FIG. 1, a PAS continuous production apparatus 100 includes a housing chamber 2 which houses a plurality of reaction vessels, namely reaction vessels 1a, 1b, and 1c. In the PAS continuous production apparatus 100, the housing chamber 2 is installed at an incline so as to form an angle θ relative to the horizontal plane H, as illustrated in FIG. 1. The shape of the housing chamber 2 is not particularly limited, and examples include a hollow round cylindrical shape or a hollow prismatic cylindrical shape, wherein a side wall 3a which abuts the reaction vessel 1a and a side wall 3b which abuts the reaction vessel 1c serve as the base surfaces.

Lines that supply the reaction raw materials are connected to the side wall 3a of the housing chamber 2. Specifically, an organic polar solvent supply line 4, which supplies an organic polar solvent to the housing chamber 2, a sulfur source supply line 5, which supplies at least one type of sulfur source selected from the group consisting of alkali metal sulfides, alkali metal hydrosulfides, and hydrogen sulfide to the housing chamber 2, and a dihalo aromatic compound supply line 6, which supplies a dihalo aromatic compound to the housing chamber 2, are each connected to the side wall 3a of the housing chamber 2. Note that an alkali metal hydroxide supply line (not illustrated), which supplies an alkali metal hydroxide to the housing chamber 2, or a water supply line (not illustrated), which supplies water, may also be connected as necessary to the side wall 3a.

The reaction raw materials of organic polar solvent, sulfur source, and dihalo aromatic compound, and other optionally used reaction raw materials may also be supplied to the liquid phase of the reaction vessel 1a via a gas phase or may be supplied directly to the liquid phase of the reaction vessel 1a. Note that in the present specification, a raw material means a raw material used in the polymerization reaction of the method of producing PAS.

A reaction mixture recovery line 7 for recovering the reaction mixture from the housing chamber 2 is connected to the side wall 3b of the housing chamber 2.

The reaction vessel 1a and the reaction vessel 1b are separated by a partition 8a, and the reaction vessel 1b and the reaction vessel 1c are separated by a partition 8b. The reaction vessel 1a, the reaction vessel 1b, and the reaction vessel 1c are mutually communicated via a gas phase in the housing chamber 2. As a result, the pressure of the gas phase in the housing chamber 2 is uniform. The effect obtained by communicating the reaction vessels in this manner will be described below.

Since the housing chamber 2 is installed at an incline so as to form an angle θ relative to the horizontal plane H as illustrated in FIG. 1, the maximum liquid surface level of liquid that can be held decreases in order from reaction vessel 1a to 1b to 1c. The reaction vessel 1a, the reaction vessel 1b, and the reaction vessel 1c are connected in series in the above order. The effect obtained by connecting the reaction vessels in this manner will be described below. Note that in each of the reaction vessels except for the reaction vessel 1a which is furthest upstream in the movement direction of the reaction mixture, the minimum height of the partition on the upstream side in the movement direction of the reaction mixture is higher than the maximum liquid surface level of that reaction vessel. Specifically, in the reaction vessel 1b, the minimum height of the partition 8a on the upstream side in the movement direction of the reaction mixture is higher than the maximum liquid surface level of the reaction vessel 1b. In the reaction vessel 1c, the minimum height of the partition 8b on the upstream side in the movement direction of the reaction mixture is higher than the maximum liquid surface level of the reaction vessel 1c. As a result, reverse flow from the reaction vessel 1b to the reaction vessel 1a and reverse flow from the reaction vessel 1c to the reaction vessel 1b are prevented. The reaction vessel 1a, the reaction vessel 1b, and the reaction vessel 1c can hold a reaction mixture 9a, a reaction mixture 9b, and a reaction mixture 9c, respectively.

Due to the reaction vessels 1a to 1c being connected serially in the above order, the reaction mixture moves by gravity and according to the difference in liquid surface levels. For this reason, according to the present embodiment, there is no need to provide a separate means for moving the reaction mixture to the subsequent reaction vessel.

A stirring blade 10a, which stirs the reaction mixture 9a in the reaction vessel 1a, a stirring blade 10b, which stirs the reaction mixture 9b in the reaction vessel 1b, and a stirring blade 10c, which stirs the reaction mixture 9c in the reaction vessel 1c, are installed on the same stirring shaft 11 in the housing chamber 2. The stirring shaft 11 is installed to penetrate through the side wall 3a from outside the housing chamber 2 and reaches the side wall 3b. A rotation drive apparatus 12 which rotates the stirring shaft 11 is installed on the end of the stirring shaft 11 nearest the side wall 3a.

One end of an exhaust line 13 is connected near the side wall 3a of the housing chamber 2. A dehydrating unit 14, which performs dehydration from the gas phase in the housing chamber 2, is connected to the other end of the exhaust line 13. The dehydrating unit 14 communicates with the gas phase in the housing chamber 2 via the exhaust line 13. One end of an organic polar solvent recovery line 15 is connected to one end (for example, the lower part) of the dehydrating unit 14. One end of a vapor recovery line 16 is connected to the other end (for example, the upper part) of the dehydrating unit 14. A gas-liquid separating unit 17 is connected to the other end of the vapor recovery line 16. A reaction raw material separating and recovering unit 19 is connected to the other end of a gas recovery line 18 which branches off from one end (for example, the upper part) of the gas-liquid separating unit 17. A waste gas line 20 and a reaction raw material resupply line 21 branch off from the reaction raw material separating and recovering unit 19, and a reaction raw material resupply unit 22 is connected to the reaction raw material resupply line 21. The reaction raw material resupply unit 22 resupplies at least a portion of the reaction materials separated and recovered in the reaction raw material separating and recovering unit 19 to at least some of the reaction vessels 1a to 1c. On the other hand, a reaction raw material separating and recovering unit 24 is connected to the other end of a liquid recovery line 23 which branches off from the other end (for example, the lower part) of the gas-liquid separating unit 17. A waste water line 25 and a reaction raw material resupply line 26 branch off from the reaction raw material separating and recovering unit 24, and a reaction raw material resupply unit 27 is connected to the reaction raw material resupply line 26. The reaction raw material resupply unit 27 resupplies at least a portion of the reaction materials separated and recovered in the reaction raw material separating and recovering unit 24 to at least some of the reaction vessels 1a to 1c. At least a portion of the reaction raw materials may be supplied to the liquid phase of at least some of the reaction vessels 1a to 1c via the gas phase, or may be supplied directly to the liquid phase of at least some of the reaction vessels 1a to 1c.

A gas feeding unit 28 is connected via a gas feeding line 29 to the side wall 3b of the housing chamber 2. The gas feeding unit 28 communicates with the gas phase in the housing chamber 2 and feeds an inert gas to that gas phase from the downstream side toward the upstream side of the movement direction of the reaction mixture, specifically, from the reaction vessel 1c toward the reaction vessel 1a. The inert gas is not particularly limited, and examples include rare gases such as argon, and nitrogen.

Next, the method of producing PAS and the operation of the PAS continuous production apparatus according to the present embodiment will be described together based on FIG. 1.

Method of Producing PAS

The present production method includes a supplying step of supplying an organic polar solvent, a sulfur source, and a dihalo aromatic compound as reaction raw materials to at least one of a plurality of reaction vessels mutually communicated via a gas phase; a dehydrating step of removing at least a portion of water present in the plurality of reaction vessels; and a polymerizing step of performing a polymerization reaction of the sulfur source and the dihalo aromatic compound in the organic polar solvent. The steps are carried out in parallel and the reaction mixture is sequentially moved between the reaction vessels. The internal temperatures of the plurality of reaction vessels are all not less than 150° C.

To specifically describe the present production method, in the supplying step, each of the reaction raw materials, namely an organic polar solvent, at least one type of sulfur source selected from the group consisting of alkali metal sulfides, alkali metal hydrosulfides, and hydrogen sulfide, and a dihalo aromatic compound, are supplied to the housing chamber 2 via the organic polar solvent supply line 4, the sulfur source supply line 5, and the dihalo aromatic compound supply line 6, respectively. Note that the reaction raw materials may be supplied to the housing chamber 2 after a portion or all of the reaction raw materials have been premixed. For example, a mixture of the organic polar solvent and the dihalo aromatic compound or a mixture of the organic polar solvent and the sulfur source may be prepared in advance, and this mixture may be supplied to the housing chamber 2. Furthermore, the mixture may be supplied after being heated, after being reacted while heating, or after being reacted without heating. In this case, for example, a mixture supply line (not illustrated) may be connected to the side wall 3a and the above mixture may be supplied to the housing chamber 2 via this mixture supply line instead of the organic polar solvent supply line 4 and dihalo aromatic compound supply line 6.

The present embodiment is a case where the sulfur source is continuously supplied. In this case, the total supply quantity in terms of sulfur atoms is preferably not less than 0.1 mol/hr, more preferably not less than 1 mol/hr, even more preferably not less than 10 mol/hr, and particularly preferably 100 mol/hr. In the case where the sulfur source is supplied in a single batch or divided into multiple batches, the total supply quantity in terms of sulfur atoms is preferably not less than 0.1 Kmol, more preferably not less than 0.2 Kmol, even more preferably not less than 0.3 Kmol.

In the polymerizing step, first, the supplied organic polar solvent, sulfur source, dihalo aromatic compound, and the like are mixed in the reaction vessel 1a, and the reaction mixture 9a is formed by a polymerization reaction of the sulfur source and the dihalo aromatic compound in the organic polar solvent.

In the present embodiment, the time from the start of the supplying step to completion of the polymerizing step is preferably not greater than 7 hours, more preferably not greater than 6 hours, and even more preferably not greater than 5 hours. Note that in the case of continuous processing, the average residence time from the start of supply to completion of polymerization is considered to be the time from the start of the supplying step to completion of the polymerizing step. Furthermore, in the case where continuous processing and batch processing are combined, it is the time needed to process the quantity of a single batch from the start of the supplying step to completion of the polymerizing step.

In a more preferred embodiment, the total supply quantity of the sulfur source in terms of sulfur atoms is preferably not less than 0.1 mol/hr, more preferably not less than 1 mol/hr, even more preferably not less than 10 mol/hr, and particularly preferably not less than 100 mol/hr, and also, the time from the start of the supplying step to completion of the polymerizing step is preferably not greater than 7 hours, more preferably not greater than 6 hours, and even more preferably not greater than 5 hours.

Those typically used in the production of PAS may be used as the organic polar solvent, the at least one type of sulfur source selected from the group consisting of alkali metal sulfides, alkali metal hydrosulfides, and hydrogen sulfide, and the dihalo aromatic compound.

Examples of the organic polar solvent include organic amide solvents. Examples of the organic amide solvents include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfides, alkali metal hydrosulfides, and hydrogen sulfide. Alkali metal sulfides and alkali metal hydrosulfides are preferred as the sulfur source from the perspective that they are easy to handle and inexpensive. The sulfur source may be handled in the form of an aqueous slurry or aqueous solution, and is preferably in the form of an aqueous solution from the perspective of ease of handling in measurement, transport, and the like.

Examples of the alkali metal sulfides include lithium sulfide, sodium sulfide, potassium sulfide, rubidium sulfide, and cesium sulfide.

Examples of the alkali metal hydrosulfides include lithium hydrosulfide, sodium hydrosulfide, potassium hydrosulfide, rubidium hydrosulfide, and cesium hydrosulfide.

When an alkali metal hydrosulfide or alkali metal sulfide is used as the sulfur source, an alkali metal hydroxide is used in combination. Examples of the alkali metal hydroxides include lithium hydroxide, sodium hydroxide, potassium hydroxide, rubidium hydroxide, cesium hydroxide, and mixtures of two or more of these. Of these, sodium hydroxide and lithium hydroxide are preferred from the perspective of being available at low cost for industrial purposes. Furthermore, an aqueous solution or slurry is preferred from the perspective of handling and the like.

When any of an alkali metal sulfide, an alkali metal hydrosulfide, and hydrogen sulfide are used in a mixture, then naturally, these mixtures serve as the sulfur source.

Examples of the dihalo aromatic compounds include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides, and dihalodiphenyl ketones. The halogen atoms in the dihalo aromatic compound each refers to an atom of fluorine, chlorine, bromine, or iodine. The two halogen atoms in the dihalo aromatic compound may be the same or different. Of these, p-dihalobenzene, m-dihalobenzene or a mixture of these two is preferred, p-dihalobenzene is more preferred, and p-dichlorobenzene (pDCB) is particularly preferred.

The alkali metal sulfide, the alkali metal hydrosulfide, and the dihalo aromatic compound respectively may be used alone, or may be used by mixing two or more types as long as the combination can produce PAS.

Note that water may be added to at least one of the reaction vessels 1a to 1c. The quantity of water added at that time may be, for example, approximately from 0.1 to 10 moles per mole of sulfur source, without particular limitation.

The above polymerization reaction is preferably carried out at 170° C. to 290° C. until the conversion ratio of the dihalo aromatic compound is not less than 50%.

The conversion ratio of the dihalo aromatic compound is preferably from 50 to 100%, more preferably from 60 to 100%, even more preferably from 65 to 100%, and particularly preferably from 70 to 100%. The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the charged amount of the dihalo aromatic compound, and the charged amount of the sulfur source.

In the present production method, in the dehydrating step, at least a portion of the water in the housing chamber 2 is removed from the housing chamber 2 via the gas phase in the housing chamber 2 by the action of the dehydrating unit 14 (described in detail later) which links to the exhaust line 13. As a result, at least a portion of the water present in the reaction vessels 1a to 1c is removed. Examples of the water in the housing chamber 2 include water supplied to the housing chamber 2 and water generated by the polymerization reaction. When the gas phase in the housing chamber 2 contains a large amount of moisture, the pressure inside the housing chamber 2 tends to be high because the vapor pressure of water is high. For this reason, the housing chamber 2 needs to be pressure-resistant, which makes it difficult to save on resources and reduce equipment costs. Dehydration is carried out by the dehydrating unit 14 and the pressure inside the housing chamber 2 is reduced. Such a configuration effectively realizes resource savings and reduced equipment costs.

The pressure inside the housing chamber 2 which is the reaction system is, for example, preferably from 0.01 MPa to 0.8 MPa, more preferably from 0.02 MPa to 0.65 MPa, even more preferably from 0.03 MPa to 0.39 MPa, and particularly preferably from 0.04 MPa to 0.37 MPa.

As described above, the reaction vessels 1a to 1c are mutually communicated via a gas phase in the housing chamber 2, and the pressure of the gas phase in the housing chamber 2 is uniform. For this reason, water is removed equally from all of the reaction vessels 1a to 1c by the dehydrating unit 14 in the dehydrating step. Thus, the quantity of water in the reaction mixture becomes smaller in the direction from the reaction vessel 1a to the reaction vessel 1c, specifically, from the upstream side to the downstream side of the movement direction of the reaction mixture. As a result, reaction inhibition due to water is suppressed and the polymerization reaction is accelerated. Furthermore, since the boiling point of the reaction mixture rises, polymerization at high temperatures becomes possible and the polymerization reaction can be further accelerated. Additionally, through the above acceleration of the polymerization reaction, the temperature of the reaction mixture tends to rise and the polymerization reaction tends to be further accelerated.

As described above, by arranging the parts as described above and performing a continuous reaction in the PAS continuous production apparatus 100, the temperature of the reaction vessels 1a to 1c can be increased from the upstream side toward the downstream side of the movement direction. In other words, the internal temperatures of the reaction vessels 1a to 1c can be set so as to increase from the upstream side toward the downstream side of the movement direction of the reaction mixture.

Furthermore, as described above, the reaction vessels 1a to 1c are connected in descending order of maximum liquid surface level of liquid that each reaction vessel can hold. As a result, in the movement process of the reaction mixture, the reaction mixture can be sequentially moved utilizing the difference in maximum liquid surface levels. More specifically, when the surface level of the reaction mixture 9a and the reaction mixture 9b exceed the maximum liquid surface level, the reaction mixtures can exceed the partition 8a and the partition 8b, respectively. Note that the shape of the partitions 8a and 8b may be any shape without particular limitation as long as there is no hindrance to the mutual communication of the reaction vessel 1a, the reaction vessel 1b, and the reaction vessel 1c via a gas phase in the housing chamber 2. Furthermore, it may be configured such that openings such as through holes or slits (not illustrated) are provided in the partitions and the reaction solution moves via these openings.

In the present embodiment, the internal temperatures of the reaction vessels 1a, 1b, and 1c are all not less than 150° C. Preferably, the supply reaction vessel to which the reaction raw materials are supplied, specifically, the reaction vessel 1a is preferably not less than 160° C., more preferably not less than 170° C., and even more preferably not less than 180° C.

Furthermore, the respective internal temperatures of the reaction vessels other than the supply reaction vessel, specifically, the reaction vessels 1b and 1c are preferably not less than 200° C., more preferably not less than 210° C., and even more preferably not less than 220° C. Additionally, the internal temperatures of one or more reaction vessels other than the supply reaction vessel are preferably not less than 245° C., more preferably not less than 250° C., and even more preferably not less than 255° C. In the present embodiment, the difference in internal temperatures of two mutually adjacent reaction vessels is preferably not less than 2° C., more preferably not less than 3° C., and even more preferably not less than 5° C. By setting the internal temperatures of the reaction vessels 1a to 1c in this manner, the above dehydrating step can be carried out mainly in the supply reaction vessel, specifically, in the reaction vessel 1a, and the polymerization reaction can be carried out mainly in the reaction vessel provided on the downstream side of the movement direction of the reaction mixture relative to the reaction vessel 1a, specifically, in the reaction vessel 1b. As a result, the polymerization reaction can be carried out more efficiently.

In the present embodiment, an inert gas be preferably fed in by the gas feeding unit 28 to the gas phase in the housing chamber 2 from the downstream side toward the upstream side of the movement direction of the reaction mixture, specifically, from the reaction vessel 1c toward the reaction vessel 1a. As described above, in order to maintain a state in which the quantity of water in the reaction mixture becomes smaller in the direction from the upstream side toward the downstream side of the movement direction of the reaction mixture, it is preferred that moisture evaporating from the reaction mixture flow to the downstream side so that it does not condense on the reaction mixture. By feeding an inert gas into the gas phase as described above via the gas feeding unit 28, water vapor can be effectively prevented from condensing on the reaction mixture by flowing to the downstream side.

The flow rate of the inert gas is not particularly limited as long as the water vapor is not hindered from flowing to the downstream side. For example, when the housing chamber 2 has a hollow round cylindrical shape of inner radius r in which the side wall 3a and the side wall 3b serve as the base surfaces, when the flow rate of the inert gas is taken as u and the volumetric flow rate of the inert gas is taken as F, the flow rate is expressed as $u=F/(\pi r^2)$. Here, in a case where the water vapor is less likely to flow to the downstream side, Taylor dispersion forms. Specifically, considering that conditions change from molecular diffusion control to convection diffusion control, the condition under which Taylor dispersion holds is $r \cdot u \gg D$ (where D is the diffusion coefficient of water vapor). From the above facts, examples of the flow rate of the inert gas include values within a range such that $F \gg D \cdot \pi r$, more specifically $F > 10 D \cdot \pi r$, preferably $F > 25 D \cdot \pi r$, and more preferably $F > 50 D \cdot \pi r$. Note that when the housing chamber 2 has a hollow round cylindrical shape in which the side wall 3a and the side wall 3b serve as the base surfaces and the cross-section perpendicular to the movement direction of the reaction mixture may have any shape, the above equation can be applied using the representative length in the direction perpendicular to the movement direction of the reaction mixture, for example, the equivalent circular radius of the cross-section having any shape, as r.

The stirring shaft 11 rotates by means of the rotation drive apparatus 12, and the stirring blades 10a to 10c installed on the stirring shaft 11 rotate accordingly around the stirring shaft 11 and mix the reaction mixtures 9a to 9c. The stirring blades 10a to 10c are installed on the same stirring shaft 11. For this reason, all of the stirring blades 10a to 10c are rotated under the same conditions simply by rotating the stirring shaft 11 by means of the rotation drive apparatus 12, and uniform mixing can be established with high efficiency.

As the above polymerization reaction proceeds, alkali metal halides such as NaCl precipitate out and accumulate in the reaction vessels 1a to 1c. As a result, the effective volume for sufficiently driving the polymerization reaction forward in the reaction vessels 1a to 1c decreases and productivity tends to drop. This results in excessive maintenance work to remove the accumulated alkali metal halides. By mixing the reaction mixtures 9a to 9c using the stirring blades 10a to 10c, the alkali metal halides disperse in the reaction mixtures 9a to 9c and move to the downstream side, and thereby easily discharged to outside the housing chamber 2. On the other hand, in a case where mixing is too vigorous, the reaction mixture flows over one or both of the partition 8a and partition 8b, needlessly moving from the reaction vessel on the upstream side and is immixed into the reaction vessel on the downstream side.

The shape, number, rotational speed, and the like of the stirring blades are preferably adjusted as appropriate so as to promote dispersion of alkali metal halides and avoid needless immixing of the reaction mixtures between the reaction vessels 1a to 1c. Examples of the rotational speed of the stirring blades include conditions under which alkali metal halides do not settle, and more specifically, a rotational speed at which the stirring velocity by the stirring blades is not less than the particle suspension limit stirring speed. From the perspective of easily preventing the reaction mixture from flowing over one or both of the partition 8a and partition 8b, the upper limit of the tip speed of the stirring blades is preferably such that the rotational speed of the stirring blades is not greater than 60 rpm, and more preferably not greater than 20.5 rpm. Furthermore, the rotation route and the like of the stirring blades is also preferably adjusted as appropriate so that stirring is sufficient. For example, the stirring blades preferably at least pass through a portion that is deeper than the average depth of each reaction vessel 1a to 1c. In particular, it is preferable to reduce the sizes of the gap between the stirring blade 10a and the bottom portion of the reaction vessel 1a, the gap between the stirring blade 10a and the partition 8a, the gap between the stirring blade 10b and the bottom portion of the reaction vessel 1b, the gap between the stirring blade 10b and the partition 8b, the gap between the stirring blade 10c and the bottom portion of the reaction vessel 1c, and the gap between the stirring blade 10c and the side wall 3b, so that stirring is sufficient and alkali metal halides do not accumulate near the deepest parts of each reaction vessel 1a to 1c.

Exhaust gas from the housing chamber 2 is supplied to the dehydrating unit 14 via the exhaust line 13. The dehydrating unit 14 acts as, for example, a distillation column, wherein a liquid containing a main component of organic polar solvent is recovered from one end (for example, the lower part), and vapor containing the sulfur source, the dihalo aromatic compound, and water is recovered from the other end (for example, the upper part).

The organic polar solvent recovered from the dehydrating unit 14 goes through purification and the like as necessary, and may be again supplied to the housing chamber 2 as a reaction raw material of the polymerization reaction. At that time, the recovered organic polar solvent may be supplied to the housing chamber 2 via the organic polar solvent supply line 4 or via an organic polar solvent supply line other than the organic polar solvent supply line 4. The supply destination of the recovered organic polar solvent may be any one of the reaction vessels 1a to 1c or a combination of two or more thereof.

The vapor recovered from the other end of the dehydrating unit 14 is supplied to the gas-liquid separating unit 17 via the vapor recovery line 16. The gas-liquid separating unit 17 acts as, for example, a distillation column, wherein gas containing the sulfur source is recovered from one end (for example, the upper part), and liquid containing the dihalo aromatic compound and water is recovered from the other end (for example, the lower part).

The gas recovered from the one end of the gas-liquid separating unit 17 is supplied to the reaction raw material separating and recovering unit 19 via the gas recovery line 18. In the reaction raw material separating and recovering unit 19, the sulfur source is separated and recovered from the gas and fed to the reaction raw material resupply line 21 via the reaction raw material resupply unit 22. On the other hand, the remaining gas is disposed of as waste gas via the waste gas line 20.

At least a portion of the sulfur source separated and recovered by the reaction raw material separating and recovering unit 19 is preferably resupplied to at least some of the reaction vessels 1a to 1c by the reaction raw material resupply unit 22. At that time, the separated and recovered sulfur source may be resupplied to the reaction vessel 1a via the sulfur source supply line 5, or via a sulfur source supply line other than the sulfur source supply line 5. By resupplying at least a portion of the sulfur source, the sulfur source can be effectively utilized and resource savings can be achieved.

The liquid recovered from the gas-liquid separating unit 17 is supplied to the reaction raw material separating and recovering unit 24 via the liquid recovery line 23. In the reaction raw material separating and recovering unit 24, the dihalo aromatic compound is separated and recovered from the liquid and fed to the reaction raw material resupply line 26 via the reaction raw material resupply unit 27. On the other hand, the remaining liquid is disposed of as waste water via the waste water line 25.

For this reason, at least a portion of the dihalo aromatic compound separated and recovered by the reaction raw material separating and recovering unit 24 is preferably resupplied to at least some of the reaction vessels 1a to 1c by the reaction raw material resupply unit 27. At that time, the separated and recovered dihalo aromatic compound may be resupplied to the reaction vessel 1a via the dihalo aromatic compound supply line 6, or via a dihalo aromatic compound supply line other than the dihalo aromatic compound supply line 6. By resupplying at least a portion of the dihalo aromatic compound, the dihalo aromatic compound can be effectively utilized and resource savings can be achieved.

Furthermore, in driving the PAS continuous production apparatus 100, the reaction mixture moves utilizing gravity and the difference in maximum liquid surface levels, and a large amount of energy is not needed. Thus, the PAS continuous production apparatus 100 can easily achieve resource savings, energy savings, and reduced equipment costs.

The lower limit of weight average molecular weight (Mw) according to gel permeation chromatography (GPC) of the PAS ultimately obtained by the present production method is not less than 8000, preferably not less than 10000, even more preferably not less than 13000, and particularly preferably not less than 15000. It is also possible to obtain PAS having a high molecular weight of 20000 or greater. The upper limit is not greater than 200000, preferably not greater than 100000, and more preferably not greater than 70000.

Furthermore, the space-time yield of the PAS ultimately obtained by the present production method is preferably not less than 14 g/hr·L, more preferably not less than 14.5 g/hr·L, even more preferably not less than 15 g/hr·L, and particularly preferably not less than 16 g/hr·L.

Thus, according to the present production method, complex control or the like is unnecessary and PAS production is easy because the reaction raw materials can be supplied to just at least one of a plurality of reaction vessels that are mutually communicated via a gas phase.

In the present embodiment, the method may further include a step of increasing the weight average molecular weight of the PAS obtained by the polymerizing step. The weight average molecular weight of the PAS may be increased by, for example, using a polymerization aid in the polymerization reaction. Specific examples of the polymerization aid include organic metal carboxylates, organic metal sulfonates, lithium halides, alkali metal sulfates, alkali earth metal oxides, alkali metal phosphates, and alkali earth metal phosphates. These can be used alone or as a combination of two or more types. Above all, an organic metal carboxylate or lithium halide is preferably used. More specific examples include lithium acetate, sodium acetate, potassium acetate, sodium propionate, lithium benzoate, sodium benzoate, sodium phenyl acetate, sodium p-tolulate, and lithium chloride. Above all, lithium acetate or sodium acetate is preferably used, and sodium acetate is more preferably used because it is inexpensive.

These polymerization aids may be used alone or may be used by mixing two or more types as long as the combination can produce PAS.

In the present embodiment, when the total quantity of water contained in the reaction raw materials is taken as 100 mass %, the quantity of water contained in the above supply reaction vessel, specifically, the reaction vessel 1a is preferably not less than 5 mass % and not greater than 99 mass %, more preferably not less than 6 mass % and not greater than 90 mass %, and even more preferably not less than 7 mass % and not greater than 80 mass %. It is preferred that the quantity of water contained in the supply reaction vessel be within this range because the quantity of water to be dehydrated is reduced in the polymerizing step.

Furthermore, the quantity of water contained in the above adjacent reaction vessel adjacent to the supply reaction vessel on the downstream side, specifically, the reaction vessel 1b is preferably not less than 5 mass % and not greater than 50 mass %, more preferably not less than 6 mass % and not greater than 40 mass %, and even more preferably not less than 7 mass % and not greater than 30 mass %. It is preferred that the quantity of water contained in the adjacent reaction vessel be within this range because the quantity of water to be dehydrated is reduced in the polymerizing step.

A method of producing PAS using a certain apparatus was described in the present embodiment, but the production method according to the present invention may further include other steps as long as the method at least involves a plurality of reaction vessels mutually communicated via a gas phase and includes the above supplying step, dehydrating step, and polymerizing step, and these steps are carried out in parallel and the reaction mixture moves sequentially between the reaction vessels, and the internal temperatures of the plurality of reaction vessels are all not less than 150° C.

Furthermore, in the present embodiment, reaction vessels having a certain shape are used, but the shape of the reaction vessels is not particularly limited.

Additionally, in the present embodiment, the number of reaction vessels is not particularly limited. Furthermore, the reaction vessels do not necessarily have to be connected in series as illustrated in FIG. 1. Thus, some of the plurality of reaction vessels may be lined up in parallel.

Additionally, for at least one pair of adjacent reaction vessels among the plurality of reaction vessels, the reaction vessel with a higher maximum liquid surface level of liquid that can be held in each reaction vessel is preferably located on the upstream side of the movement direction of the reaction mixture, and the reaction mixture is preferably moved utilizing the difference in maximum liquid surface level. By doing so, resource savings, energy savings, and reduced equipment costs can be achieved because the reaction mixture moves utilizing gravity in at least one pair of reaction vessels.

Additionally, in the present embodiment, the feeding step of feeding in the above inert gas is preferably carried out in parallel with each of the above steps. Furthermore, a separating and recovering step of separating and recovering a portion of the reaction raw materials as described above and a resupplying step of supplying at least a portion of the reaction raw materials to at least one of the reaction vessels are preferably further carried out in parallel with each of the above steps.

Additionally, in the present embodiment, a configuration in which the reaction raw materials are supplied to the reaction vessel 1a was described, but the reaction vessel to which the reaction raw materials are supplied is not specific.

Embodiment 2

Next, another embodiment of the present invention will be described in detail.

Figure 2:
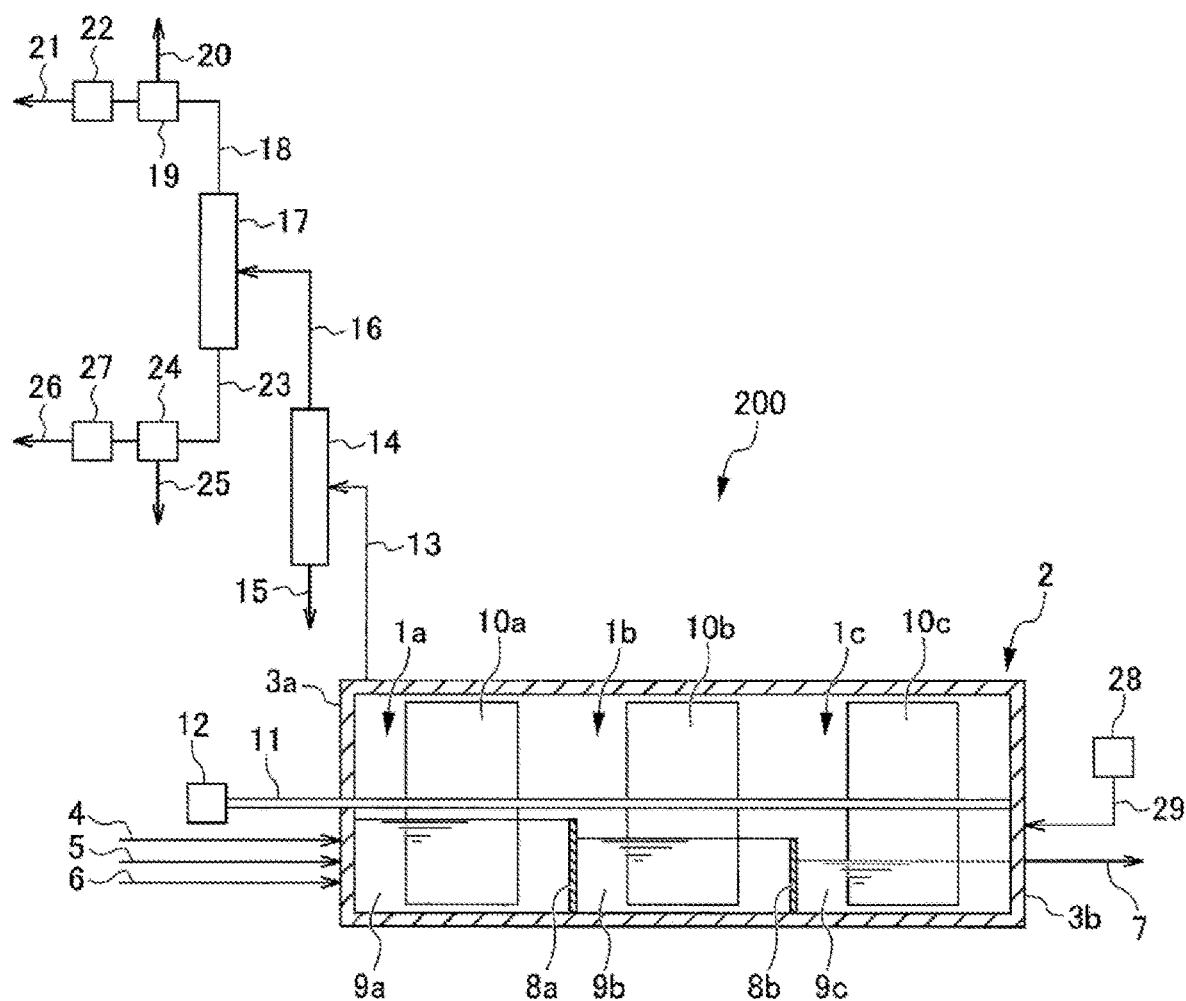
FIG. 2 is a partial cross-sectional view of a PAS continuous production apparatus according to Embodiment 2 of the present invention.

FIG. 2 is a partial cross-sectional view of another PAS continuous production apparatus used in the present production method. The method of producing PAS and the configuration and operation of the PAS continuous production apparatus according to the present embodiment will be described below based on FIG. 2. Note that components having the same function as components described in Embodiment 1 are assigned the same reference signs and their descriptions are omitted.

In the present embodiment, a PAS continuous production apparatus 200 used in the present production method is the same as the PAS continuous production apparatus 100 according to Embodiment 1 except that the housing chamber 2 is placed horizontally, the dimensions of the partition 8a and the dimensions of the partition wall 8b differ, and the connection position of the reaction mixture recovery line 7 on the side wall 3b differs.

The PAS continuous production apparatus 200 operates in the same manner as the PAS continuous production apparatus 100 described in Embodiment 1 (see FIG. 1) except that when the base surface areas of the reaction vessels 1a to 1c are equal, as illustrated in FIG. 2, the quantity of reaction mixture that can be held decreases in order from reaction vessel 1a to 1b to 1c.

In the PAS continuous production apparatus 200, unlike the PAS continuous production apparatus 100, the depths of the reaction vessels 1a to 1c are substantially constant depending on location. Thus, it is particularly preferred that mixing by the stirring blades 10a to 10c be sufficient because alkali metal halides generated by the polymerization reaction readily accumulate on the entire bottom surfaces of the reaction vessels 1a to 1c. To ensure sufficient stirring by the stirring blades 10a to 10c so that alkali metal halides do not accumulate, the width of the stirring blades 10a to 10c is preferably wide, for example, not less than 50%, preferably not less than 60%, more preferably not less than 70%, and even more preferably not less than 80% of the width of the reaction vessels 1a to 1c. Furthermore, some or all of the stirring blades 10a to 10c are preferably positioned in the center of each reaction vessel from the perspective that a large deviation in mixing does not readily occur, and so forth.

In the present invention, a case where the stirring shaft 11 in the above Embodiments 1 and 2 is single-screw is illustrated, but it may be multi-screw such as a twin-screw or triple-screw.

Embodiment 3

Next, yet another embodiment of the present invention will be described in detail.

Figure 3:
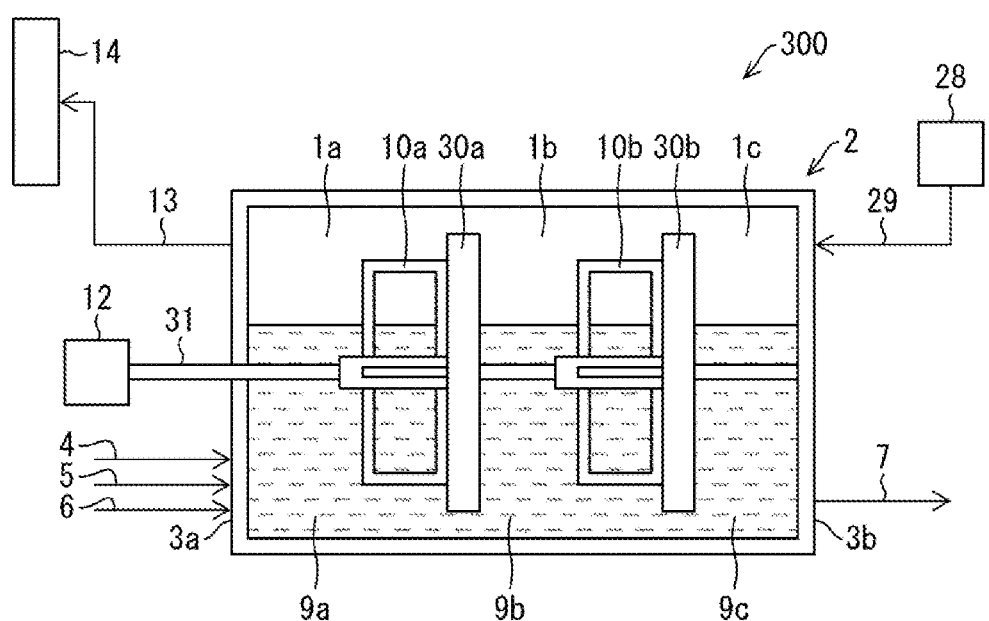
FIG. 3 is a partial cross-sectional view of a PAS continuous production apparatus according to Embodiment 3 of the present invention.

FIG. 3 is a partial cross-sectional view of another PAS continuous production apparatus used in the present production method. The configuration and operation of the present embodiment will be described below based on FIG. 3.

To describe the present embodiment in reference to FIG. 3, a PAS continuous production apparatus 300 differs from the above embodiments in that the separation means that separate the reaction vessels in the housing chamber 2 are divider plates having a rotating center.

In the present embodiment, the reaction vessel 1a and the reaction vessel 1b are separated by a divider plate 30a, and the reaction vessel 1b and the reaction vessel 1c are separated by a divider plate 30b. The reaction vessel 1a, the reaction vessel 1b, and the reaction vessel 1c are mutually communicated via a gas phase portion in the housing chamber 2.

Furthermore, a stirring blade 10a which stirs the reaction mixture 9a in the reaction vessel 1a is mounted on one face of the divider plate 30a. Similarly, a stirring blade 10b which stirs the reaction mixture 9b in the reaction vessel 1b is mounted on one face of the divider plate 30b. Note that the stirring blades 10a and 10b in the present embodiment have a structure in which openings are provided on the inner side.

The stirring blades 10a and 10b together with the divider plates 30a and 30b are all installed on the same rotation shaft 31. The rotation shaft 31 is installed so as to penetrate through the side wall 3a from outside the housing chamber 2 and reach the side wall 3b. A rotation drive apparatus 12 which rotates the rotation shaft 31 is installed on the end of the rotation shaft 31 nearest the side wall 3a.

Note that the stirring blades may be installed at any position relative to the divider plates. The divider plates may be on the upstream side or the downstream side of the stirring blades, or both arrangements may be present. The divider plate may be separated from the stirring blade, but they are preferably adhered and connected as in FIG. 3 because the divider plate can be thereby fixed and reinforced. Furthermore, the stirring blade and divider plate do not necessarily have to be in pairs, and there may be cases where no stirring blade is present between adjacent divider plates. Providing at least one stirring blade aids progression of the polymerization reaction and also enables smoother movement of solids in the reaction mixture. Alternatively, stirring blade may not be provided, thereby enabling a simpler apparatus configuration.

The shape of the divider plate is not particularly limited and may be any shape that has a rotating center and partially blocks the vertical cross-section inside the housing chamber 2 while also providing clearance of a certain width or an opening such that adjacent reaction vessels are communicated. For example, when the housing chamber 2 has a hollow round cylindrical shape, the divider plate may have a disc shape of a radius smaller than the interior space of the housing chamber, as illustrated in FIG. 3. Note that the shape of the divider plate is not limited thereto, and may be a cage-like rotating object that does not have a center axis.

The number of divider plates provided on the rotation shaft may be any number of one or greater depending on the size of the housing chamber, the type of polymerization reaction, and the like.

When two or more divider plates are provided, they may have the same or different shapes.

The positions of the divider plates may be any position without particular limitation.

On the other hand, the shape of the stirring blade is not particularly limited, and may be any shape that is provided coaxially with the divider plate and that stirs the reaction mixture. The stirring blades 10a and 10b may be mounted on either one face of the divider plates 30a and 30b, as illustrated in FIG. 3, or on both faces. Alternatively, stirring blades 10a and 10b may be mounted on the rotation shaft 31 separately from the divider plates.

The liquid phase portions of the reaction vessels 1a to 1c are mutually communicated. As a result, the raw materials and solvents supplied to the reaction vessel 1a move as a reaction mixture sequentially to the reaction vessels 1b and 1c while the polymerization reaction is driven forward.

Furthermore, the gas phase portions of the reaction vessels 1a to 1c are also mutually communicated. As a result, the pressure of the gas phase inside the housing chamber 2 is uniform. Due to the temperature difference inside the apparatus and the like, the vapor component generated during polymerization in each of the reaction vessels sequentially moves in the direction from the reaction vessel 1c to the reaction vessels 1b and 1a via the gas phase portion and are discharged from the exhaust line 13.

In the PAS continuous production apparatus 300 in the present embodiment, clearance with a certain width is present between the inner wall of the housing chamber 2 and the outer edges of the divider plates 30a and 30b. As a result, the gas phase portions of adjacent reaction vessels are communicated with each other and the liquid phases portions are communicated with each other, and the reaction mixture, gas containing vapor components, and the like move. Note that openings such as through holes or slits may be provided in the divider plates instead of providing clearance, and the reaction vessels may be communicated via these openings. Alternatively, both clearance and openings may be provided. Alternatively, the divider plate may have a mesh form having a plurality of narrow through holes.

The clearance width and the size of the openings are not particularly limited, and may be set as appropriate according to the shape of the containers and the shape and number of divider plates, and the like.

Embodiment 4

Next, yet another embodiment of the present invention will be described in detail.

In the PAS continuous production apparatus according to the present embodiment, a plurality of reaction vessels are arranged adjacently in the vertical direction inside a housing chamber. It is configured such that mutually adjacent reaction vessels (not illustrated) are separated by divider plates that are affixed without gaps, and the reaction mixture moves through a connection pipe sequentially from the upper reaction vessel to the lower reaction vessel. Furthermore, the gas phase portions of the reaction vessels are mutually communicated by a communicating pipe. As a result, the pressure of the gas phase in the reaction vessels in the housing chamber is substantially equal. The communicating pipe that connects the gas phase portions may be the same as the connection pipe through which the reaction mixture sequentially moves, or it may be a pipe provided separately from the connection pipe. Here, the case where a first reaction vessel and a second reaction vessel are provided in that order from the top in the vertical direction will be specifically described as an example. The first reaction vessel and the second reaction vessel are communicated via a first connection pipe, and the pipe wall of the first connection pipe protrudes on the first reaction vessel side. The height of the pipe wall of the first connection pipe is provided so as to be equal to the maximum liquid surface level of liquid that can be held by the first reaction vessel. The first connection pipe penetrates through a first divider plate that separates the first reaction vessel and the second reaction vessel.

In the PAS continuous production apparatus having such a configuration, when the height of the reaction mixture exceeds the maximum liquid surface level of the first reaction vessel, the reaction mixture flows over the pipe wall of the first connection pipe and flows into the first connection pipe, and flows into the second reaction vessel via the first connection pipe. The reaction mixture can also be sequentially moved with such a configuration of the PAS continuous production apparatus.

Furthermore, the gas phase portion of the first reaction vessel and the gas phase portion of the second reaction vessel are mutually communicated by a connection pipe or communicating pipe.

Embodiment 5

Next, yet another embodiment of the present invention will be described in detail.

Figure 4:
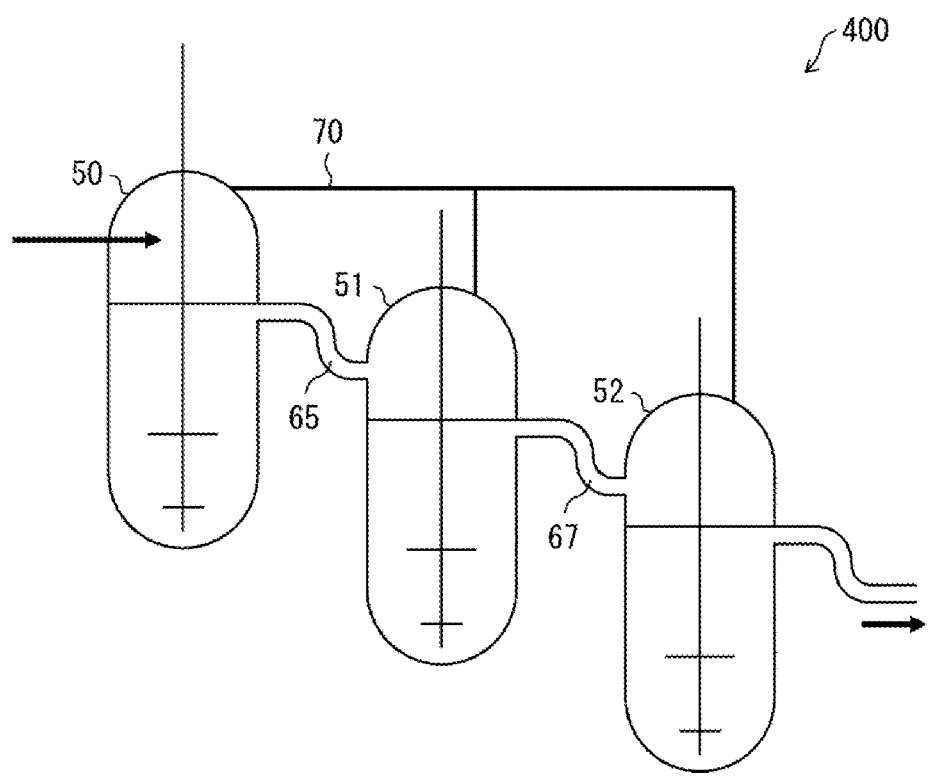
FIG. 4 is schematic view of the configuration of a PAS continuous production apparatus according to Embodiment 5 of the present invention.

FIG. 4 is schematic view of a modified example of the configuration of a PAS continuous production apparatus.

To describe the apparatus in reference to FIG. 4, a PAS continuous production apparatus 400 includes a first reaction vessel 50, a second reaction vessel 51, and a third reaction vessel 52. The second reaction vessel 51 is arranged vertically below the first reaction vessel 50, and the third reaction vessel 52 is arranged vertically below the second reaction vessel 51.

The first reaction vessel 50 and the second reaction vessel 51 are connected by a first pipe 65. The second reaction vessel 51 and the third reaction vessel 52 are connected by a second pipe 67.

The first pipe 65 is provided such that the reaction mixture (not illustrated) in the first reaction vessel 50 moves to the second reaction vessel 51 via the first pipe 65 when the reaction mixture in the first reaction vessel 50 exceeds the maximum liquid surface level.

The second pipe 67 is provided such that the reaction mixture (not illustrated) in the second reaction vessel 51 moves to the third reaction vessel 52 via the second pipe 67 when the reaction mixture in the second reaction vessel 51 exceeds the maximum liquid surface level.

Additionally, a ventilation unit 70 is connected to the first to third reaction vessels 50 to 52. The first to third reaction vessels 50 to 52 are communicated via the gas phase via the ventilation unit 70.

Through such a configuration of the PAS continuous production apparatus 400, an effect similar to that of Embodiments 1 and 2 is also obtained when the reaction mixture is moved sequentially utilizing the difference in maximum liquid surface levels of the first reaction vessel 50 and second reaction vessel 51. Additionally, according to the PAS continuous production apparatus 400, it is unnecessary to provide the partitions as shown in Embodiments 1 and 2 and the divider plates as shown in Embodiment 3.

Although the PAS continuous production apparatuses in Embodiments 2 to 5 differ in configuration from the PAS continuous production apparatus in Embodiment 1, all share the common point that the gas phase portions of each reaction vessel are communicated. For this reason, dehydration can be performed and the reaction can be driven forward by the same mechanism as the PAS continuous production apparatus in Embodiment 1. Thus, similar to when the PAS continuous production apparatus in Embodiment 1 is used, PAS can be produced with good space-time yield.

SUMMARY

As described above, a method of producing polyarylene sulfide (PAS) according to one embodiment of the present invention includes a supplying step of supplying an organic polar solvent, a sulfur source, and a dihalo aromatic compound as reaction raw materials to at least one of a plurality of reaction vessels mutually communicated via a gas phase; a dehydrating step of removing at least a portion of water present in the plurality of reaction vessels; and a polymerizing step of performing a polymerization reaction of the sulfur source and the dihalo aromatic compound in the organic polar solvent. The steps are carried out in parallel and the reaction mixture is sequentially moved between the reaction vessels. The internal temperatures of the plurality of reaction vessels are all not less than 150° C.

In an embodiment of the present production method, the internal temperature of the supply reaction vessel into which the reaction raw materials are supplied is preferably not less than 170° C. and the internal temperatures of the reaction vessels other than the supply reaction vessel are preferably not less than 200° C.

In an embodiment of the present production method, the internal temperature of the one or more reaction vessels other than the supply reaction vessel is preferably not less than 245° C.

In an embodiment of the present production method, at least some of the plurality of reaction vessels may be connected in series.

In an embodiment of the present production method, for at least one pair of adjacent reaction vessels among the plurality of reaction vessels, the reaction vessel with a higher maximum liquid surface level of liquid that can be held in each reaction vessel may be located on the upstream side of the movement direction of the reaction mixture, and the reaction mixture may be moved utilizing the difference in maximum liquid surface levels.

In an embodiment of the present production method, the plurality of reaction vessels may be connected in descending order of maximum liquid surface level of liquid that can be held in each reaction vessel from the upstream side toward the downstream side of the movement direction of the reaction mixture, and the reaction mixture may be moved utilizing the difference in maximum liquid surface levels.

In an embodiment of the present production method, a feeding step of feeding an inert gas from the downstream side toward the upstream side of the movement direction of the reaction mixture may be further carried out in parallel with each of the steps.

In an embodiment of the present production method, a separating and recovering step of separating and recovering a portion of the reaction raw materials and a resupplying step of supplying at least a portion of the reaction raw materials to one or more of the reaction vessels may be further carried out in parallel with each of the steps.

In an embodiment of the present production method, the internal temperatures of the reaction vessels are set so as to increase from the upstream side toward the downstream side of the movement direction of the reaction mixture.

In an embodiment of the present production method, the pressure in the reaction system is preferably from 0.01 MPa to 0.8 MPa.

In an embodiment of the present production method, the space-time yield is preferably not less than 14 g/hr·L.

In an embodiment of the present production method, the total supply quantity of the sulfur source in terms of sulfur atoms is preferably not less than 0.1 Kmol, and the time from the start of the supplying step to completion of the polymerizing step is preferably not greater than 7 hours.

In an embodiment of the present production method, the total supply quantity of the sulfur source in terms of sulfur atoms is preferably not less than 0.1 mol/hr, and the time from the start of the supplying step to completion of the polymerizing step is preferably not greater than 7 hours.

In an embodiment of the present production method, the method further includes a step of increasing the weight average molecular weight of polyarylene sulfide obtained by the polymerizing step.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Example 1

Examples of the present invention will be described in further detail.

The same PAS continuous production apparatus as that illustrated in FIG. 1 was used except that the housing chamber 2 included six reaction vessels divided with five partitions. This PAS continuous production apparatus was a reaction apparatus made of Ti (internal volume approximately 2.1 L) having dimensions of approximately 100 mm in diameter by approximately 300 mm in length and having semicircular partitions. In the above PAS continuous production apparatus, after 950 g of NMP was charged, the temperature 1 of the portions segmented by the first partition and the second partition was maintained at 230° C. and the temperature 2 of the portions segmented by the third partition and the fourth partition were maintained at 260° C., and raw materials including a mixture of NMP and p-dichlorobenzene (pDCB) at a flow rate of 3.53 g/min (NMP:pDCB (weight ratio)=988:268) and 36.00 wt. % NaSH at a flow rate of 0.84 g/min were continuously supplied from respective supply lines using a constant volume pump for 5 hours. The number of moles of sulfur source supplied to the reaction apparatus was 1.62 mol.

At the same time, water was continuously removed from the PAS continuous production apparatus using a distillation apparatus connected to the PAS continuous production apparatus while controlling the pressure to a gauge pressure of 0.32 MPa using a pressure regulating valve, and further, the pDCB in the removed water was separated in a settling tank and returned to the PAS continuous production apparatus.

Furthermore, the gas from the distillation apparatus was washed with 15.84 wt. % NaOH at 1.37 g/min and NMP at 0.50 g/min supplied to a gas absorption column, and then released. At that time, the total amount of the NaOH aqueous solution and NMP in which gas had been absorbed was supplied from the upstream side to the reaction vessel on the upstream side of the first partition. As a result, the water supplied from the upstream side to the reaction vessel on the upstream side of the first partition was 17.4 mol per mol of sulfur source.

The polymerization reaction product was continuously extracted by allowing it to overflow from the reaction apparatus, and then cooled.

The time until the charged raw materials were recovered as a polymer, specifically, the total time of the charging step, the dehydrating step, and the polymerizing step was 3 hours on average. The space-time yield was 16 g/hr·L.

The obtained reaction product was collected and analyzed. The raw material pDCB conversion ratio was 97.0%. The reaction mixture was washed three times with an equal weight of acetone and three times with an equal weight of water. It was then filtered, and the obtained cake was dried under vacuum at 80° C. for 8 hours, to obtain PPS powder. The weight average molecular weight Mw according to GPC of the PPS powder was 27300.

Example 2

The same PAS continuous production apparatus as that illustrated in FIG. 3 was used except that the housing chamber included 11 reaction vessels divided with 10 disk-shaped divider plates. In this continuous production apparatus, the housing chamber body had dimensions of 108 mm in inner diameter by 300 mm in length. All of the 10 divider plates had the same shape, and were provided on a rotation shaft of diameter 5 mm. On the face of each divider plate on the upstream side of the movement direction of the reaction mixture, two anchor-type stirring blades made of the same material as the downstream-side divider plate were provided in a plus-sign formation. The diameter of each divider plate was 100 mm, the length in the long axial direction of the anchor-type stirring blades was 90 mm, and the length thereof in the short axial direction was 40 mm. At the location where the divider plate was provided, the proportion of the cross-section of clearance relative to the perpendicular cross-section of the interior space of the housing chamber was approximately 14%.

In the above continuous production apparatus, after 1700 g of N-methyl-2-pyrrolidone (NMP) as an organic amide solvent was charged, the temperature 1 of the second reaction vessel counting from the upstream side was maintained at 230° C., the temperature 2 of the fifth reaction vessel was maintained at 260° C., and the temperature 3 of the 11th reaction vessel was maintained at 260° C. using an external heater installed on the bottom portion of the housing chamber while nitrogen gas was allowed to flow from the downstream side of the 11th reaction vessel counting from the upstream side of the movement direction of the reaction mixture. Here, the flow rate of nitrogen gas was 0.1 NL/min, and at standard state, the linear flow rate of nitrogen gas passing through the clearance of the divider plate was 0.8 cm/s.

Raw materials including an NMP-pDCB mixture at a flow rate of 3.76 g/min (NMP:pDCB (weight ratio)=1852:1382) and 36.5 wt. % NaSH at a flow rate of 1.63 g/min were continuously supplied from respective supply lines using a constant volume pump.

At the same time, water was continuously removed from the continuous production apparatus using a distillation apparatus connected to the continuous production apparatus while controlling the pressure to a gauge pressure of 0.32 MPa using a pressure regulating valve. Further, the pDCB in the removed water was separated in a settling tank and returned to the continuous production apparatus. Furthermore, the gas from the distillation apparatus was washed with 16.32 wt. % NaOH at 2.68 g/min and NMP at 0.50 g/min supplied to a gas absorption column, and then released. At that time, the total amount of the NaOH aqueous solution and NMP in which gas had been absorbed was supplied from the upstream side to the first reaction vessel.

After the above operation was continued for 6 hours, the obtained reaction product was collected and analyzed. The raw material pDCB conversion ratio according to gas chromatography analysis was 93.8% The reaction mixture was washed three times with an equal weight of acetone and three times with an equal weight of water and then filtered. The obtained cake was dried under vacuum at 80° C. for 8 hours, to obtain PPS powder. The weight average molecular weight Mw according to GPC of the PPS powder was 11000.

REFERENCE SIGNS LIST 1a, 1b, 1c Reaction vessel
2 Housing chamber
3a, 3b Side wall
4 Organic polar solvent supply line
5 Sulfur source supply line
6 Dihalo aromatic compound supply line
7 Reaction mixture recovery line
8a, 8b Partition
9a, 9b, 9c Reaction mixture 10a, 10b, 10c Stirring blade
11 Stirring shaft
12 Rotation drive apparatus
13 Exhaust line
14 Dehydrating unit
15 Organic polar solvent recovery line
16 Vapor recovery line
17 Gas-liquid separating unit
18 Gas recovery line
19, 24 Reaction raw material separating and recovering unit
20 Waste gas line
21, 26 Reaction raw material resupply line
22, 27 Reaction raw material resupply unit
23 Liquid recovery line
25 Waste water line
28 Gas feeding unit
29 Gas feeding line
30a, 30b Divider plate
31 Rotation shaft
100, 200, 300, 400 PAS continuous production apparatus
H Horizontal plane

The invention claimed is:

1. A method of producing polyarylene sulfide, the method comprising:
a supplying step of supplying an organic polar solvent, a sulfur source, and a dihalo aromatic compound as reaction raw materials to at least one of a plurality of reaction vessels mutually communicated via a gas phase;
a dehydrating step of removing at least a portion of water present in the plurality of reaction vessels; and
a polymerizing step of performing a polymerization reaction of the sulfur source and the dihalo aromatic compound in the organic polar solvent, wherein
the steps are carried out in parallel and a reaction mixture is sequentially moved between the reaction vessels;
internal temperatures of the plurality of reaction vessels are all not less than 150° C.; and a pressure of the gas phase in the housing chamber is uniform.

2. The method of producing polyarylene sulfide according to claim 1, wherein an internal temperature of a supply reaction vessel into which the reaction raw materials are supplied is not less than 170° C. and internal temperatures of the reaction vessels other than the supply reaction vessel are not less than 200° C.

3. The method of producing polyarylene sulfide according to claim 2, wherein an internal temperature of one or more reaction vessels other than the supply reaction vessel is not less than 245° C.

4. The method of producing polyarylene sulfide according to claim 1, wherein at least some of the plurality of reaction vessels are connected in series.

5. The method of producing polyarylene sulfide according to claim 1, wherein, for at least one pair of adjacent reaction vessels among the plurality of reaction vessels, a reaction vessel with a higher maximum liquid surface level of liquid that can be held in each reaction vessel is located on an upstream side in a movement direction of the reaction mixture, and the reaction mixture is moved utilizing a difference in maximum liquid surface levels.

6. The method of producing polyarylene sulfide according to claim 1, wherein the plurality of reaction vessels are connected in descending order of maximum liquid surface level of liquid that can be held in each reaction vessel from an upstream side toward a downstream side of the movement direction of the reaction mixture, and the reaction mixture is moved utilizing a difference in maximum liquid surface levels.

7. The method of producing polyarylene sulfide according to claim 1, wherein a feeding step of feeding an inert gas from the downstream side toward the upstream side of the movement direction of the reaction mixture is further carried out in parallel with each of the steps.

8. The method of producing polyarylene sulfide according to claim 1, wherein a separating and recovering step of separating and recovering a portion of the reaction raw materials and a resupplying step of supplying at least a portion of the reaction raw materials to at least one of the reaction vessels are further carried out in parallel with each of the steps.

9. The method of producing polyarylene sulfide according to claim 1, wherein the internal temperatures of the reaction vessels are set so as to increase from the upstream side toward the downstream side of the movement direction of the reaction mixture.

10. The method of producing polyarylene sulfide according to claim 1, wherein a pressure in the reaction system is from 0.01 MPa to 0.8 MPa.

11. The method of producing polyarylene sulfide according to claim 1, wherein a space-time yield is not less than 14 g/hr·L.

12. The method of producing polyarylene sulfide according to claim 1, wherein a total supply quantity of the sulfur source in terms of sulfur atoms is not less than 0.1 Kmol, and a time from a start of the supplying step to completion of the polymerizing step is not greater than 7 hours.

13. The method of producing polyarylene sulfide according to claim 1, wherein a total supply quantity of the sulfur source in terms of sulfur atoms is not less than 0.1 mol/hr, and a time from a start of the supplying step to completion of the polymerizing step is not greater than 7 hours.

14. The method of producing polyarylene sulfide according to claim 1, further comprising a step of increasing a weight average molecular weight of polyarylene sulfide obtained by the polymerizing step.

* * * * *